US009009937B2

(12) United States Patent
Saito et al.

(10) Patent No.: US 9,009,937 B2
(45) Date of Patent: Apr. 21, 2015

(54) SLEEVE REMOVAL TOOL AND SLEEVE REMOVAL METHOD

(75) Inventors: Manabu Saito, Tokyo (JP); Hideharu Takahashi, Tokyo (JP); Tatsuo Nakahata, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 671 days.

(21) Appl. No.: 13/323,302

(22) Filed: Dec. 12, 2011

(65) Prior Publication Data

US 2012/0144643 A1 Jun. 14, 2012

(30) Foreign Application Priority Data

Dec. 13, 2010 (JP) ................................ 2010-277301

(51) Int. Cl.
*B23P 19/04* (2006.01)
*B25B 27/06* (2006.01)

(52) U.S. Cl.
CPC ......... *B25B 27/062* (2013.01); *Y10T 29/53657* (2015.01); *Y10T 29/49815* (2015.01)

(58) Field of Classification Search
USPC .................................................... 29/244–282
See application file for complete search history.

(56) References Cited

U.S. PATENT DOCUMENTS

| | | | | |
|---|---|---|---|---|
| 5,519,929 | A | 5/1996 | Bleckman | |
| 2004/0056435 | A1* | 3/2004 | Bedi et al. | 279/75 |
| 2007/0147974 | A1* | 6/2007 | McGovern et al. | 411/413 |
| 2009/0126180 | A1 | 5/2009 | Keener | |
| 2012/0144643 | A1* | 6/2012 | Saito et al. | 29/426.1 |

* cited by examiner

*Primary Examiner* — Lee D Wilson
(74) *Attorney, Agent, or Firm* — Konomi Takeshita

(57) ABSTRACT

The object of the invention is to provide a sleeve removal tool that is able to easily remove a sleeve from a tap without damaging the sleeve. The sleeve removal tool has a first fastening member and a second fastening member. The first fastening member has a first contact surface and inner screw section, and is formed in a cylindrical shape. The first contact surface comes in contact with the flange of the sleeve all around one ring shaped surface. An inner screw section is provided such that it protrudes in the axial direction from the first contact surface. The second fastening member has a second contact surface and outer screw section, and is formed in a cylindrical shape. The first contact surface comes in contact all around the other ring shaped surface of the flange.

3 Claims, 9 Drawing Sheets

SLEEVE REMOVAL TOOL AND SLEEVE REMOVAL METHOD

CROSS REFERENCE TO RELATED APPLICATIONS

This application claims priority under 35 U.S.C. 119 based upon Japanese Patent Application Serial No. 2010-277301, filed on Dec. 13, 2010. The entire disclosures of the aforesaid applications are incorporated herein by reference.

FIELD OF THE INVENTION

The present invention relates to a sleeve removal tool and sleeve removal method for removing a cylindrical sleeve which has a flange from a tap screwed into the sleeve.

BACKGROUND OF THE INVENTION

Japanese Laid-open Patent Publication No. 2009-144914 discloses a fastener that joins a plurality of base materials together by pressure fitting cylindrical sleeves each of which has a flange into through holes that are formed on the base materials and then inserting and attaching rivets into the sleeves. This sleeve is used for purposes such as protecting the through hole, maintaining an electrical connection and the like. Incidentally, when a sleeve having a wrong length is pressure fitted into the through hole, it becomes necessary to remove the sleeve from the base material. However, there is a problem in that because the sleeve is extremely thin, the sleeve cannot be grasped using a tool, and so removal is difficult. Therefore, there is a feasible method of removing the sleeve from the base material in which by screwing a tap into the sleeve and cutting a screw into the inner surface of the sleeve, the sleeve and tap become engaged and the tap is pulled out from the base materials.

With this kind of method, the tap remains screwed into the sleeve, so the sleeve must be removed from the tap. However, for example, in the case of grasping the sleeve with a tool such as a pair of pliers and removing the sleeve from the tap by turning the tap, there is a problem in that because the sleeve is extremely thin, there is a possibility that the sleeve may be damaged.

SUMMARY OF THE INVENTION

The object of the present invention is to provide a sleeve removal tool and sleeve removal method capable of easily removing a sleeve from a tap without damaging the sleeve.

According to a first embodiment of the present invention for achieving the purpose described above, there is provided a sleeve removal tool for removing a cylindrical sleeve from a tap screwed into the sleeve, wherein the sleeve has a flange, the flange having a first ring-shaped surface that faces to a first direction along the center axis of the sleeve and a second ring-shaped surface that faces to a second direction that is opposite from the first direction, the sleeve removal tool, comprising:

a first fastening member having a first contact surface that comes in contact with the first ring-shaped surface of the flange, and an inner circumferential surface that extends in the second direction from the first contact surface, wherein an inner screw section is formed around the inner circumferential surface; and a second fastening member having an outer screw section that screws into the inner screw section of the first fastening member, and a second contact surface that comes in contact with the second ring-shaped surface of the flange when the outer screw section screws into the inner screw section of the first fastening member, wherein the sleeve removal tool holds the flange by catching the flange between the first contact surface of the first fastening member and the second contact surface of the second fastening member.

According to a second embodiment of the present invention for achieving the purpose above, it is preferable that in the sleeve removal tool a cutout section is formed in an outer circumferential surface of at least one of the first fastening member and the second fastening member; and the cutout section penetrates through the first fastening member or the second fastening member in a direction that is along the center axis of the inner screw section or the outer screw section, and has a width greater than an outer diameter of an outer circumferential surface of the tap.

According to a third embodiment of the present invention for achieving the purpose described above, there is provided a sleeve removal method for removing a cylindrical sleeve from a tap screwed into the sleeve, using a sleeve removal tool, wherein the sleeve has a flange, the flange having a first ring-shaped surface that faces to a first direction along the center axis of the sleeve and a second ring-shaped surface that faces to a second direction that is opposite from the first direction, wherein the sleeve removal tool has:

a first fastening member having a first contact surface that comes in contact with the first ring-shaped surface of the flange; and a second fastening member configured to screw into the second fastening member, and having a second contact surface that comes in contact with the second ring-shaped surface of the flange when the second fastening member screws into the first fastening member, the sleeve removal method comprising the steps of:

holding the flange by catching the flange between the first contact surface of the first fastening member and the second contact surface of the second fastening member, by screwing the second fastening member into the first fastening member; and removing the sleeve from the tap by rotating the tap around the center axis of the tap relative to the first fastening member and the second fastening member.

With the present invention, the ring-shaped surfaces of the flange can be held by the first contact surface of the first fastening member and the second contact surface of the second fastening member. Therefore, by rotating the tap around the center axis of the tap relative to the first fastening member and second fastening member, the sleeve can be removed from the tap without damaging the sleeve.

Other features and advantages of the present invention will become apparent from the following detailed description, taken in conjunction with the accompanying drawings, which illustrate, by way of example, the principles of the invention.

DETAILED DESCRIPTION OF THE INVENTION

Figure 1:
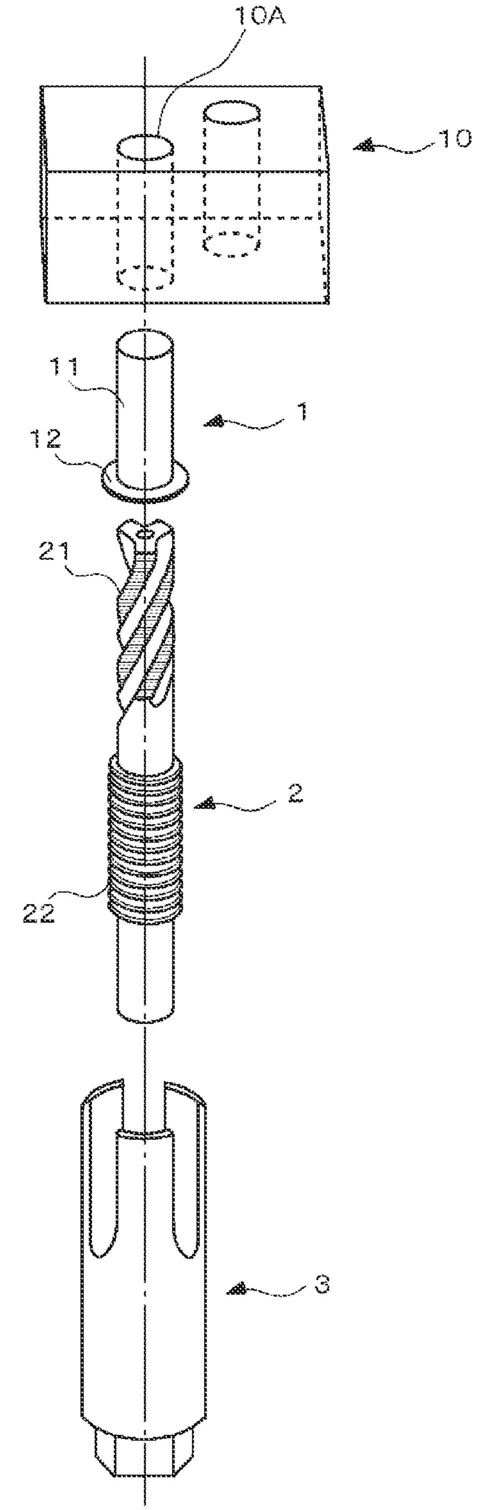
FIG. 1 is an exterior perspective view of a sleeve, a tap and a bridge.

FIG. 1 is an exterior perspective view of a sleeve, a tap and a bridge. First, the sleeve 1 that will be the object for using the sleeve removal tool of the present invention, and the tap 2 that is screwed into the sleeve 1 will be explained. The sleeve 1 has a cylindrical section 11 and a flange 12 that is formed on an opening end of the cylindrical section 11. The cylindrical section 11 is pressure fitted into a through hole 10A that is formed in a base material 10. The sleeve 1 can be removed from the base material 10 by using a tap 2 and a bridge 3. The tap 2 is a column shaped tap having a cutting blade section 21 that is formed around the outer circumferential surface of the tip end side (top side in FIG. 1), and screw section 22 that is formed around the outer circumferential surface of the middle section. The bridge 3 is a cylindrical tool that is attached to the tap 2 and used for removing the sleeve 1 from the base material 10 together with the tap 2.

Figures 2A, 2B, 2C, 2D:
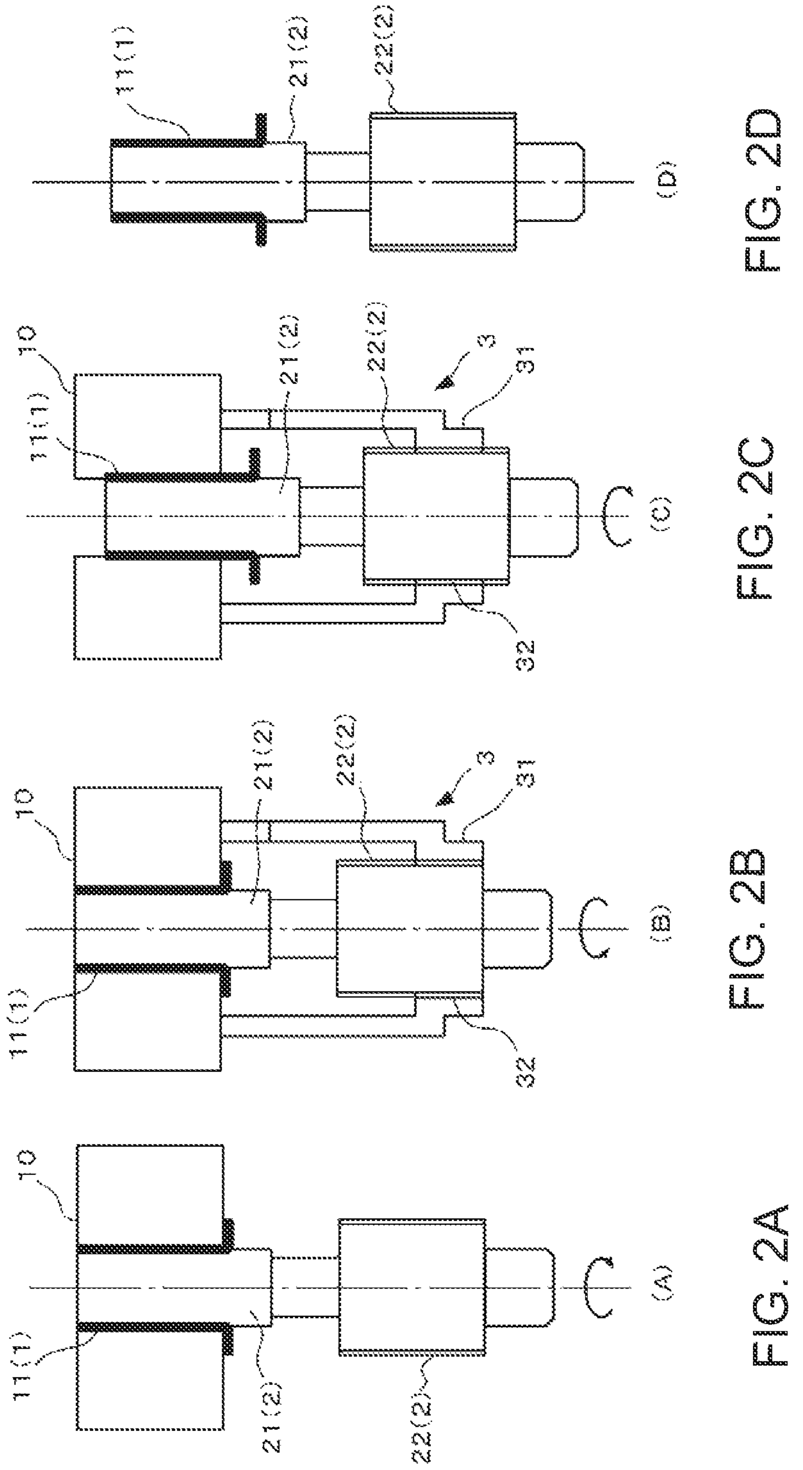
FIG. 2A to FIG. 2D are explanative drawings for explaining the procedure for removing a sleeve from the base materials.

FIG. 2A to FIG. 2D are explanative drawings for explaining the procedure of removing the sleeve 1 from the base material 10. In order to remove the sleeve 1 from the base material 10, first the cutting blade section 21 of the tap 2 is pressed against the cylindrical section 11 of the sleeve 1, and the tap 2 is rotated in the direction of a right-hand screw. As a result, the cutting blade section 21 is screwed into the cylindrical section 11 (FIG. 2A). In other words, by cutting a screw into the inner circumferential surface of the cylindrical section 11, the sleeve 1 and tap 2 become engaged. In this embodiment, the tap 2 is rotated by using a one-way bearing (not illustrated in the drawing) to turn the base end section of the tap 2.

Figure 3:
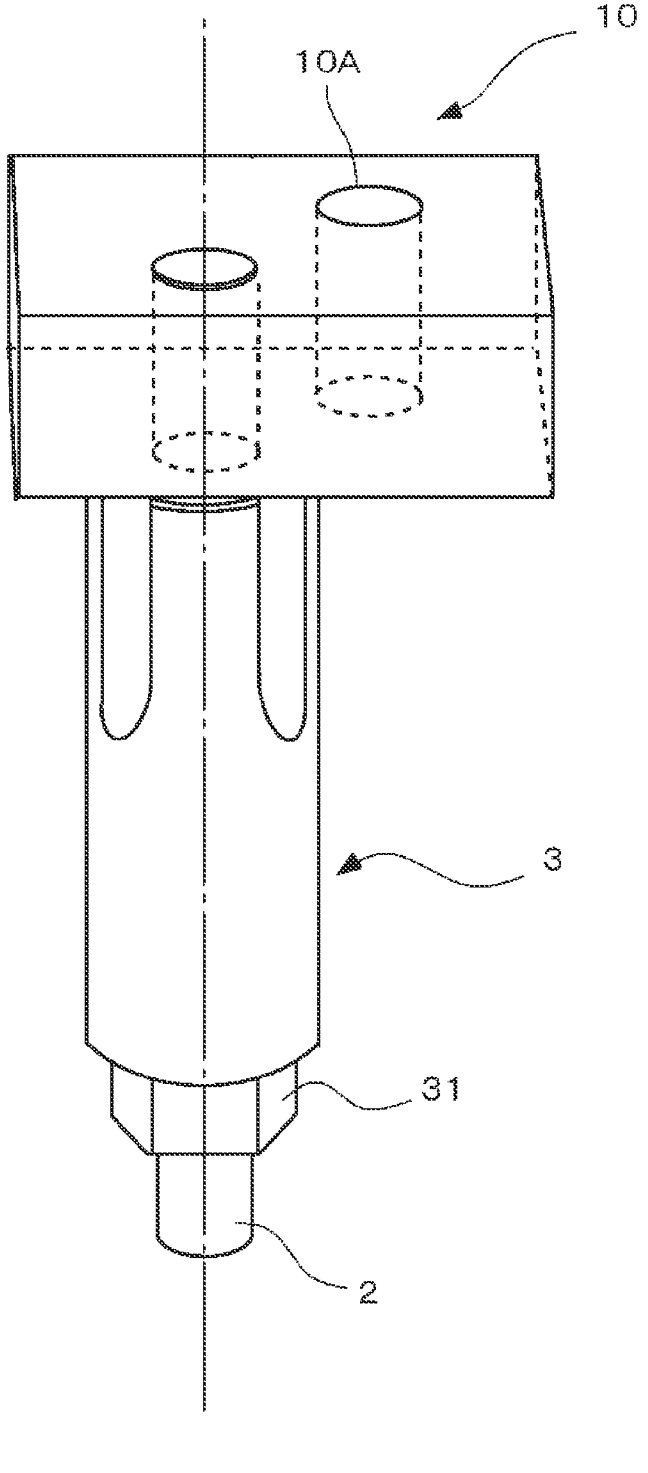
FIG. 3 is an exterior perspective view illustrating the state of a bridge being attached to a tap.

FIG. 3 is an exterior perspective view illustrating the state of the bridge 3 attached to the tap 2. The bridge 3 has a nut section 31 and a screw section 32 (FIGS. 2B, 2C). The nut section 31 is formed around the outer circumferential surface of the base end section (section on the bottom side in FIG. 3). The screw section 32 is formed around the inner circumferential surface of the base end section. This screw section 32 screws onto the screw section 22 of the tap 2. In order to attach the bridge 3 to the tap 2, the tap 2 is housed inside the bridge 3, and by turning the nut section 31 in the left-hand screw direction, the screw section 32 is screwed onto the screw section 22 (FIG. 2B). Then, as the tap 2 is further rotated in the right-hand screw direction with the tip end of the bridge 3 in contact with the base material 10, the bridge 3 pushes the tap 2 away from the base material 10, so the tap 2 can be pulled out from the base material 10 together with the sleeve 1 (FIG. 2C). As a result, the sleeve 1 is removed from the base material 10 with the tap 2 screwed in the sleeve 1 (FIG. 2D).

Figure 4:
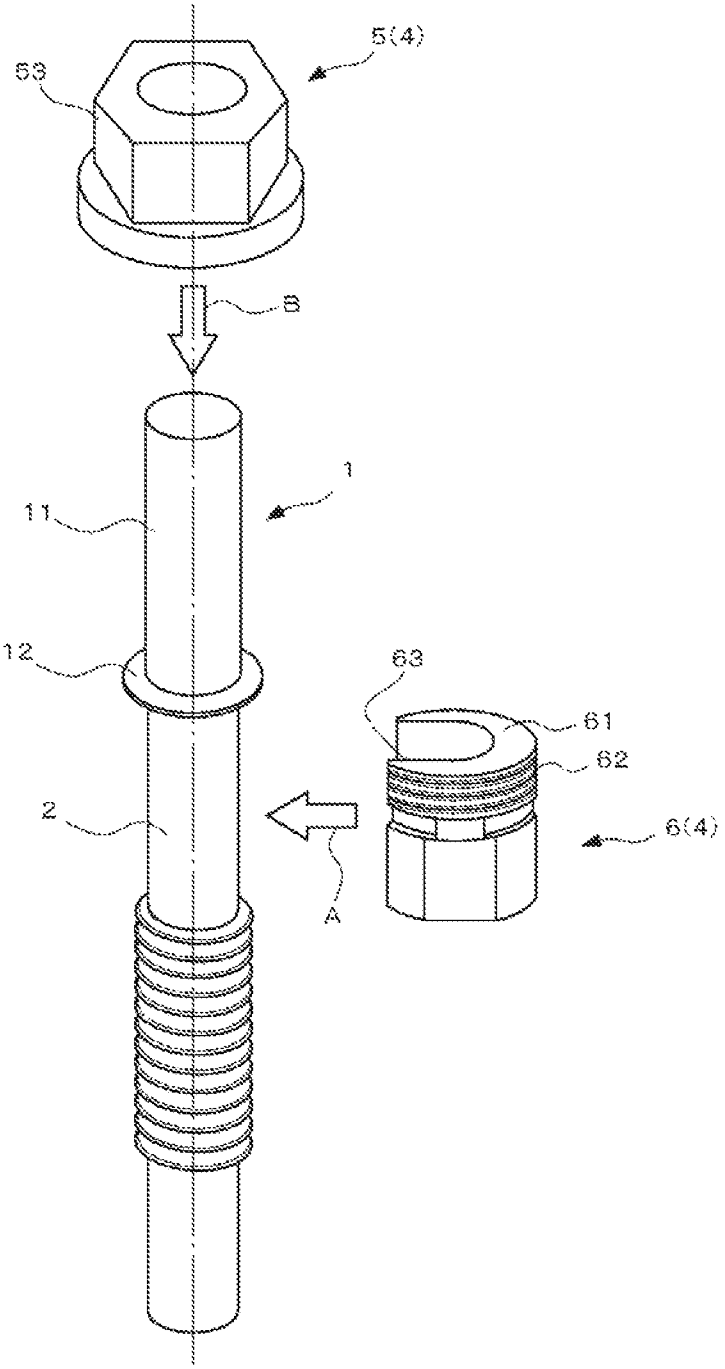
FIG. 4 is an exterior perspective view of a sleeve, a tap and a tap removal tool.

FIG. 4 is an exterior perspective view of a sleeve 1, a tap 2 and a sleeve removal tool. In the following, the sleeve removal tool 4 of the present invention will be explained. The sleeve removal tool 4 is a tool for removing the sleeve 1 from the tap 2. This sleeve removal tool 4 has a first fastening member 5 and second fastening member 6.

Figure 5:
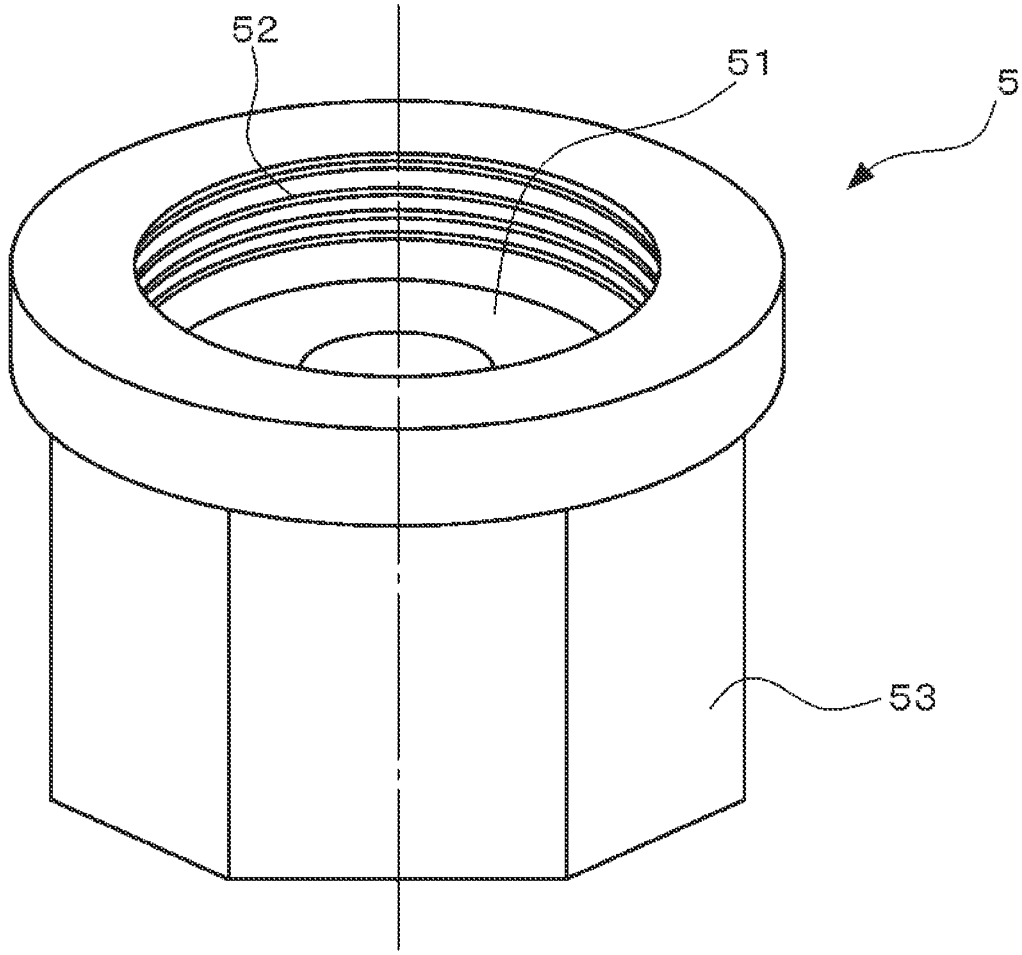
FIG. 5 is an exterior perspective view of a first fastening member.

FIG. 5 is an exterior perspective view of the first fastening member 5. The first fastening member 5 is formed into a cylindrical shape and has a first contact surface 51, an inner screw section 52 and a nut section 53. The first contact surface 51 comes in contact around the entire surface of one of the ring shaped surface (surface on the top side in FIG. 4) of the flange 12 of the sleeve 12. The inside screw section 52 is formed such that it protrudes in the axial direction from the first contact surface 51. The nut section 53 is formed around the outer circumferential surface.

Figure 6:
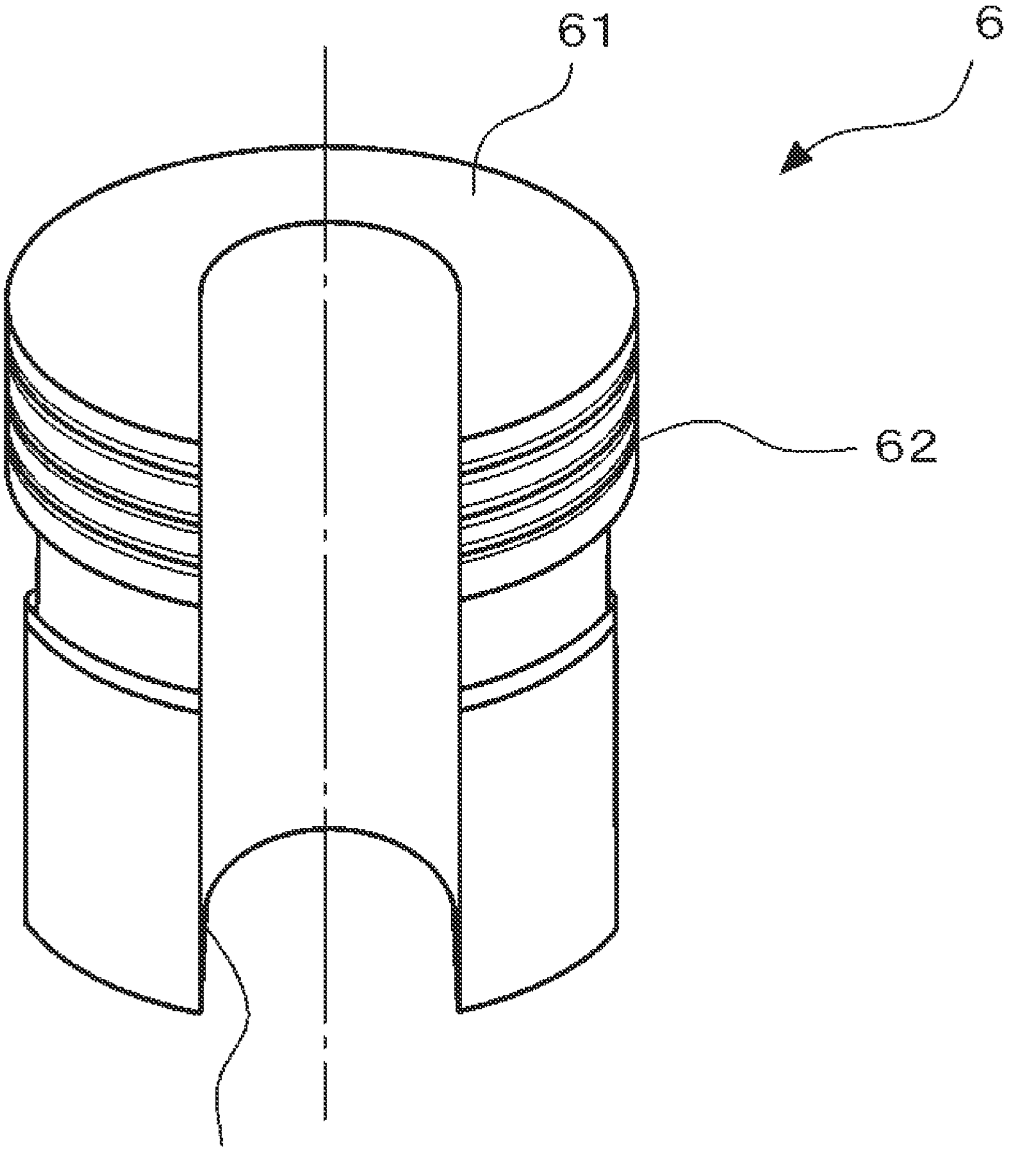
FIG. 6 is an exterior perspective view of a second fastening member.

FIG. 6 is an exterior perspective view of the second fastening member 6. The second fastening member 6 is formed into a cylindrical shape and has a second contact surface 61, an outer screw section 62 and a cutout section 63. The second contact surface 61 comes in contact around the entire surface of the other ring shaped surface (bottom surface in FIG. 4) of the flange 12. The outer screw section 62 is formed around the outer circumferential surface on the second contact surface side. The cutout section 63 is formed along the axial direction and penetrates from the outer circumferential surface to the inner circumferential surface, and has a width that is greater than the diameter of the other circumferential surface of the tap 2.

Figure 7B:
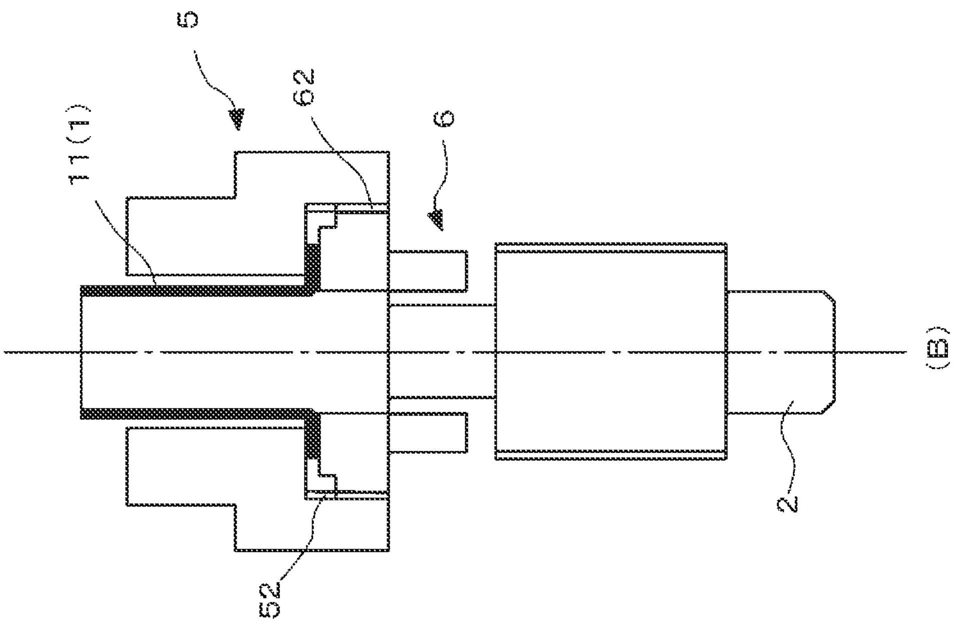
FIG. 7A and FIG. 7B are explanative drawings for explaining the procedure for fastening the first fastening member and second fastening member.
Figure 7A:
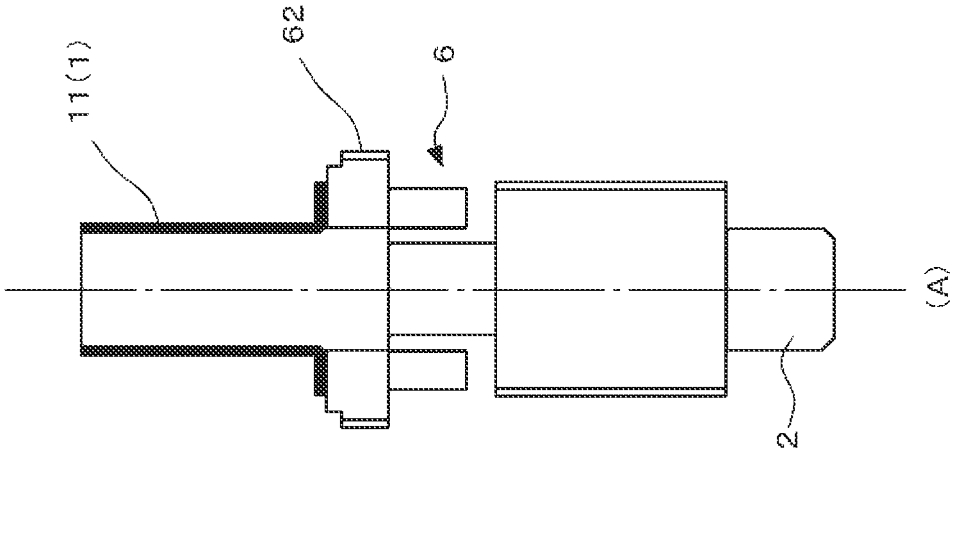
Figure 8:
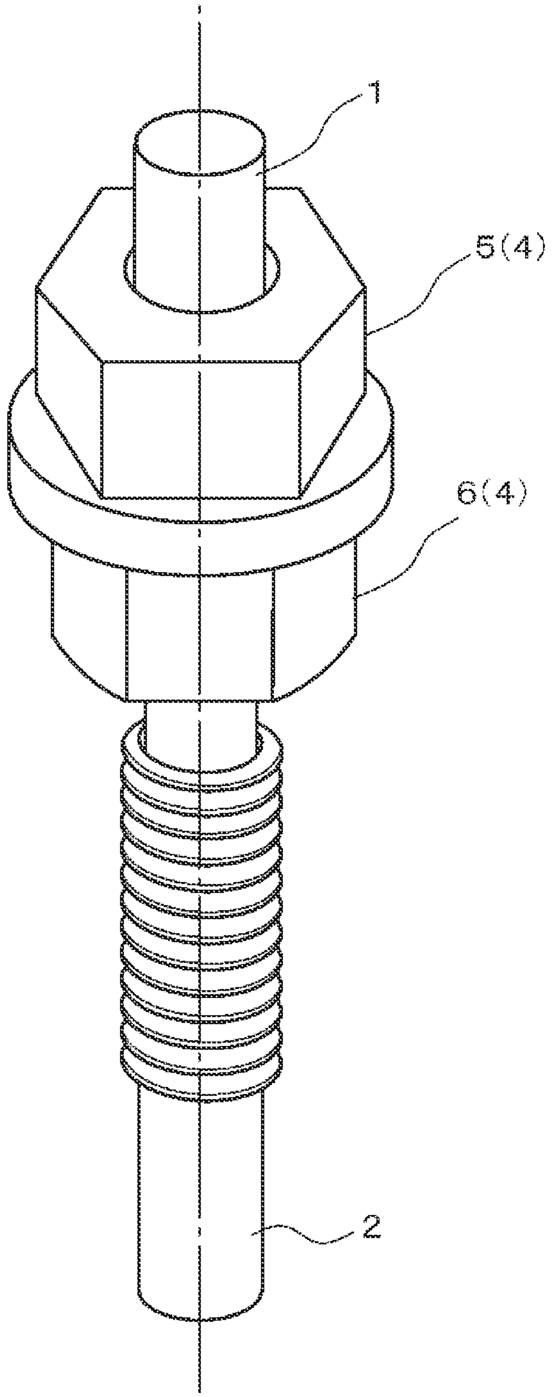
FIG. 8 is an exterior perspective view illustrating the fastened state of the first fastening member and second fastening member.

FIG. 7A and FIG. 7B are explanative drawings for explaining the procedure for fastening the first fastening member 5 and second fastening member 6. FIG. 8 is an exterior perspective view illustrating the fastened state of the first fastening member 5 and second fastening member 6. In the following, the procedure for removing the sleeve 1 from the tap 2 by using the sleeve removal tool 4 is explained. First, the second fastening member 6 is placed over the tap 2 by way of the cutout section 63 (Arrow A in FIG. 4), and the second contract surface 61 is brought into contact with the other ring shaped surface of the flange 12 (FIG. 7A). The cylindrical section 11 of the sleeve 1 is then inserted into the first fastening member 5 (arrow B in FIG. 4), and by rotating the nut section 53 in the right-hand screw direction, the inner screw section 52 is screwed onto the outer screw section 62. As a result, the first contact surface 51 is brought into contact with the one ring shaped surface of the flange 12 (FIG. 7B). In other words, as illustrated in FIG. 8, by fastening the first fastening member 5 and the second fastening member 6 to form one member, the flange 12 is held between the first contact surface 51 and the second contact surface 61.

Figure 9B:
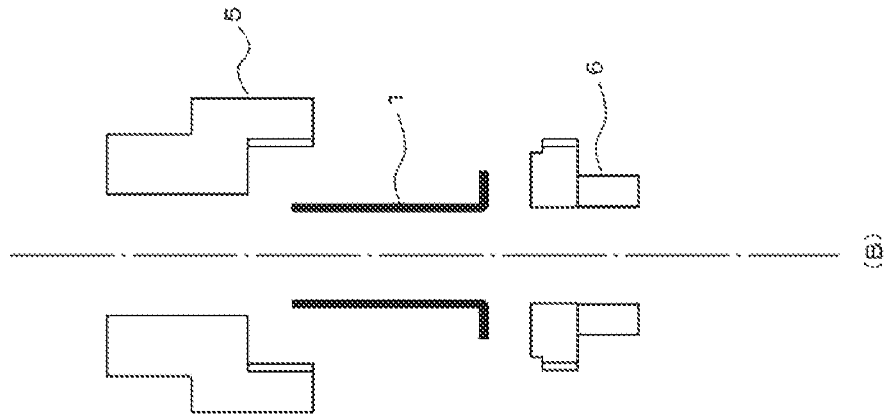
FIG. 9A and FIG. 9B are explanative drawings for explaining the procedure for removing a sleeve from a tap.
Figure 9A:
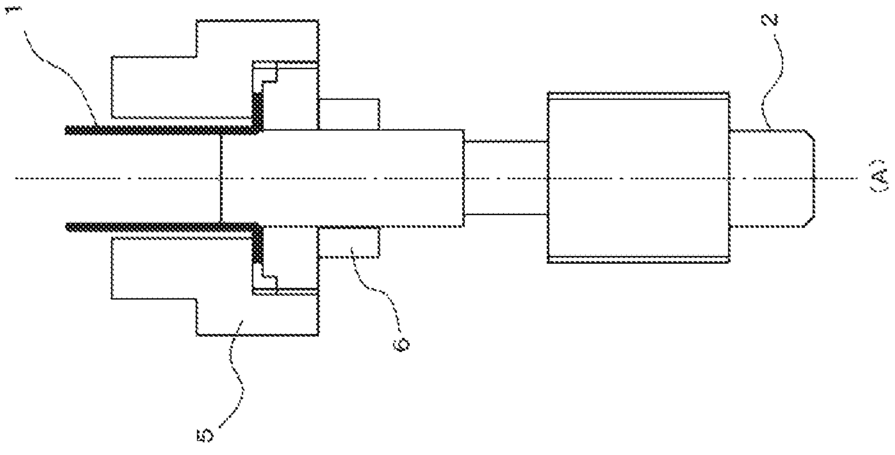

FIG. 9A and FIG. 9B are explanative drawings illustrating the procedure for removing the sleeve 1 from the tap 2. With the first fastening member 5 and second fastening member 6 fastened together to form one member, the nut section 53 of the first fastening member 5 is grasped, and by rotating the tap 2 around its axis in the left-hand screw direction, the sleeve 1 is removed from the tap 2 together with the first fastening member 5 and second fastening member 6 (FIG. 9A). Then, by unfastening the first fastening member 5 and the second fastening member 6, the sleeve is removed (FIG. 9B).

In this way, with this embodiment, the ring shaped surfaces of the flange 12 can be held around the entire circumference between the first contact surface 51 of the first fastening member 51 and the second contact surface of the second fastening member 6. Therefore, by rotating the tap 2 around it axis relative to the first fastening member 5 and second fastening member 6, the sleeve 1 can be removed from the tap 2 without being damaged. The first fastening member 5 and second fastening member 6 have diameters that are greater than that of the sleeve 1, so by grasping the nut section 53 of the first fastening member 5, and rotating the tap 2 around it axis relative to the nut section 53, it is possible to easily remove the sleeve from the tap 2 with less force than in the case of grasping the sleeve 1.

In the embodiment described above, the first fastening member 5 having an inner screw comes in contact with the flange 12 of the sleeve 1 on the cylindrical section 11 side, and the second fastening member 6 having an outer screw comes in contact with the flange 12 of the sleeve on the side opposite the cylindrical section 11 side. However, it is possible for the first fastening member 5 having an inner screw to come in contact with the flange 12 of the sleeve 1 on the side opposite the cylindrical section 11 side, and for the second fastening member 6 having an outer screw to come in contact with the flange 12 of the sleeve 1 on the cylindrical section 11 side. In short, the flange 12 should be held between the first contact surface 51 and the second contact surface 61 by fastening the first fastening member 5 and second fastening member 6 together to form one fastening member. In this case, the width of the cutout section 63 of the second fastening member 6 is greater than the diameter of the cylindrical section 11 of the sleeve 1.

Moreover, in the embodiment described above, the second fastening member 6 has a cutout section 63 that is formed along the axial direction and penetrates from the outer circumferential surface to the inner circumferential surface, and has width that is greater than the diameter of the outer circumferential surface of the tap 2, however it does not have to have a cutout section 63. In other words, the second fastening member can be formed into a cylindrical shape. In that case, by making the inner diameter of that cylinder greater than the outer diameter of the screw section 22 of the tap 2 and by inserting the tap 2 into the cylinder from the rear end side of the tap 2 with the tap 2 and the sleeve 1 engaged (FIG. 4), the second fastening member 6 can be brought into contact with the flange 12. Moreover, it is possible for the first fastening member 5 to have a cutout section instead of the second fastening member 6 or for both the second fastening member 6 and first fastening member 5 to have a cutout section.

However, in order to more securely hold the flange 12 between the first contact surface 51 and second contact surface 61, preferably the fastening member that comes in contact with the side of the flange 12 on the cylindrical section 11 side has an inner screw and no cutout section, and the fastening member that comes in contact with the side of the flange 12 that is opposite from the cylindrical section 11 side has an outer screw and cutout section (embodiment in FIG. 4). Also, preferably the inner diameter of the fastening members and the width of the cutout section are as small as possible within an allowable range. This is because of the following reasons. Preferably the contact area between the first contact surface 51 and the flange 12 and the contact area between the second contact surface 61 and the flange 12 are both a large surface area, and particularly these contact areas are large toward the center axis. However, when the fastening member that comes in contact with the side of the flange 12 that is opposite the cylindrical section 11 side is cylindrical shaped with no cutout section, in order to be able to insert the rear end side of the tap 2 (bottom side in FIG. 4) into the fastening member, it is necessary for the inner diameter of the fastening member to be made large. As a result, it is not possible to maintain sufficient contact area between the fastening member and the flange 12. Furthermore, by providing the cutout section in the fastening member having the outer screw rather than in the fastening member having the inner screw, the fastening force between the two fastening members becomes stronger.

In the embodiment described above, by grasping the nut section 53 of the first fastening member 5 and rotating the tap 2 around its axis in the left-hand screw direction, the sleeve 1 is removed from the tap 2 together with the first fastening member 5 and second fastening member 6. However, it is also possible to remove the sleeve from the tap together with the first fastening member and second fastening member by grasping the second fastening member and rotating the tap. Furthermore, the construction for grasping the first fastening member and second fastening member is not limited to a hexagonal nut, and could be a square nut, or could be grasped by providing an arm or the like that is perpendicular to the axial direction from the outer circumferential surface of the fastening member.

In the embodiment described above, the first contact surface 51 comes in contract around the entire surface of one ring shaped surface of the flange 12 of the sleeve 1, however, the first contact surface could come in contact around nearly the entire surface. For example, it is possible to form a plurality of holes or uneven sections on the first contact surface and second contact surface. It is also possible, for example, to attach a member having a high coefficient of friction such as rubber to the first contact surface and second contact surface. That is, the first contact surface and section contact surface should come in contact around nearly the entire surface of the ring surface of the flange.

Furthermore, in the embodiment described above, by screwing together the inner screw section 52 and the outer screw section 62, the first fastening member 5 and the second fastening member 6 are fastened together to form a single member, however, it is also possible to fasten the first fastening member and second fastening member together to form a single member using a method other than a screw.

INDUSTRIAL APPLICABILITY

As described above, the present invention can be widely applied to sleeve removal tools and sleeve removal methods for removing a cylindrical shaped sleeve having a flange from a tap that is screwed into the sleeve.

It is to be understood that the above-described embodiments are illustrative of only a few of the many possible specific embodiments which can represent applications of the principles of the invention. Numerous and varied other arrangements can be readily devised by those skilled in the art without departing from the spirit and scope of the invention.

What is claimed is:

1. A sleeve removal tool for removing a cylindrical sleeve from a tap screwed into the sleeve, wherein the sleeve has a flange, the flange having a first ring-shaped surface that faces to a first direction along the center axis of the sleeve and a second ring-shaped surface that faces to a second direction that is opposite from the first direction, the sleeve removal tool, comprising:

a first fastening member which forms a separate individual first member having a first contact surface that comes in contact with the first ring-shaped surface of the flange, and an inner circumferential surface that extends in the second direction from the first contact surface, wherein an inner screw section is formed around the inner circumferential surface; and a second fastening member which forms a separate individual member being separate from said first fastening member having an outer screw section that screws into the inner screw section of the first fastening member, a second contact surface that comes in contact with the second ring-shaped surface of the flange when the outer screw section screws into the inner screw section of the first fastening member, and a second outer section with a polygonal section, wherein the sleeve removal tool holds the flange by catching the flange between the first contact surface of the first fastening member and the second contact surface of the second fastening member.

2. The sleeve removal tool according to claim 1, wherein a cutout section is formed in an outer circumferential surface of at least one of the second fastening member; and the cutout section penetrates through the second fastening member.

3. The sleeve removal tool according to claim 1, wherein a cutout section is formed in an outer circumferential surface of at least one of the first fastening member; and the cutout section penetrates through the first fastening member.

* * * * *